(12) United States Patent
Park

(10) Patent No.: US 8,286,588 B2
(45) Date of Patent: Oct. 16, 2012

(54) AUTOMATIC PET FOOD DISPENSING DEVICE

(76) Inventor: Sung Ho Park, Chino Hills, CA (US)

( * ) Notice: Subject to any disclaimer, the term of this patent is extended or adjusted under 35 U.S.C. 154(b) by 76 days.

(21) Appl. No.: 12/764,848

(22) Filed: Apr. 21, 2010

(65) Prior Publication Data

US 2010/0269757 A1  Oct. 28, 2010

Related U.S. Application Data

(60) Provisional application No. 61/171,779, filed on Apr. 22, 2009.

(51) Int. Cl.
*A01K 5/02* (2006.01)
(52) U.S. Cl. .................. 119/57.1; 119/57.92; 119/57.91
(58) Field of Classification Search ............... 119/51.01, 119/57.1, 57.5, 57.92, 54; 222/168.5, 170, 222/171, 217, 218, 367, 370
See application file for complete search history.

(56) References Cited

U.S. PATENT DOCUMENTS

| | | | |
|---|---|---|---|
| 698,919 A * | 4/1902 | Fleckenstein | 222/217 |
| 1,274,548 A | 8/1918 | Holnagel et al. | |
| 2,677,350 A | 5/1954 | Prestidge et al. | |
| 2,898,010 A * | 8/1959 | Tepper | 222/339 |
| 3,258,174 A * | 6/1966 | Mullen | 222/307 |
| 4,427,297 A * | 1/1984 | Stastny | 366/19 |
| 4,513,688 A | 4/1985 | Fassauer | |
| 4,665,862 A | 5/1987 | Pitchford, Jr. | |
| 4,735,171 A | 4/1988 | Essex | |
| 4,823,738 A | 4/1989 | Gold | |
| 4,922,857 A | 5/1990 | Arentoft | |
| 5,031,575 A | 7/1991 | Phillips | |
| 5,199,381 A | 4/1993 | Masopust | |
| 5,363,805 A | 11/1994 | Wing | |
| 5,647,299 A | 7/1997 | Pearson-Falcon | |
| 5,775,255 A | 7/1998 | Louviere, III | |
| 5,906,174 A * | 5/1999 | Muldoon | 119/54 |
| 5,979,360 A | 11/1999 | Tharp | |

(Continued)

FOREIGN PATENT DOCUMENTS

DE  3112743 A1  10/1982

(Continued)

OTHER PUBLICATIONS

Machine translation of DE 3301045 to Eheim et al., published Jul. 1984.*

(Continued)

*Primary Examiner* — Rob Swiatek
*Assistant Examiner* — Kathleen Iwasaki
(74) *Attorney, Agent, or Firm* — Christie, Parker & Hale, LLP

(57) ABSTRACT

An pet food dispensing device includes a dispenser, an outer case, a pet food container, a slant guide, a driving device, and dispensing spouts. The dispenser includes a shaft, a dispensing disc, a rectangular push-out plate, a semi-circular plate and a stirrer. The dispensing disc includes top and bottom layers, which are positioned adjacently. The top layer of the dispensing disc includes one or more bumps on the top surface. The rectangular foam push out plate turns counter-clockwise dispensing pet food from the upper portion of semi-circular plate towards slant guide. The stirrer of the pet food dispenser includes a first flap extended from the first edge of the bottom layer of the dispensing disc, and the first flap is bent downwardly below the horizontal plane.

17 Claims, 11 Drawing Sheets

U.S. PATENT DOCUMENTS

| | | |
|---|---|---|
| 6,135,056 A | 10/2000 | Kuo |
| 6,192,831 B1 | 2/2001 | Brunse |
| 6,401,657 B1 | 6/2002 | Krishnamurthy |
| 2006/0185606 A1 | 8/2006 | Park |
| 2011/0220684 A1* | 9/2011 | Webster et al. ............... 222/370 |

FOREIGN PATENT DOCUMENTS

| | | | |
|---|---|---|---|
| DE | 3301045 A1 * | 7/1984 | |
| DE | 29714072 U1 | 10/1997 | |
| DE | 19750074 C1 | 3/1999 | |
| FR | 2599722 A1 | 12/1987 | |
| GB | 2 211 390 A | 7/1989 | |
| WO | WO 9419932 A1 * | 9/1994 | |
| WO | WO 03053137 A1 * | 7/2003 | |

OTHER PUBLICATIONS

International Search Report for International Application No. PCT/US2010/032085; date of mailing Jun. 23, 2010; search completed Jun. 3, 2010; 1 page.

* cited by examiner

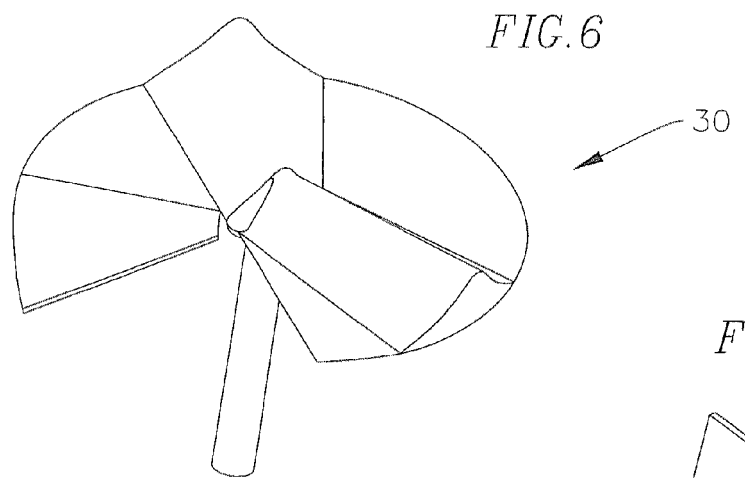
FIG.6
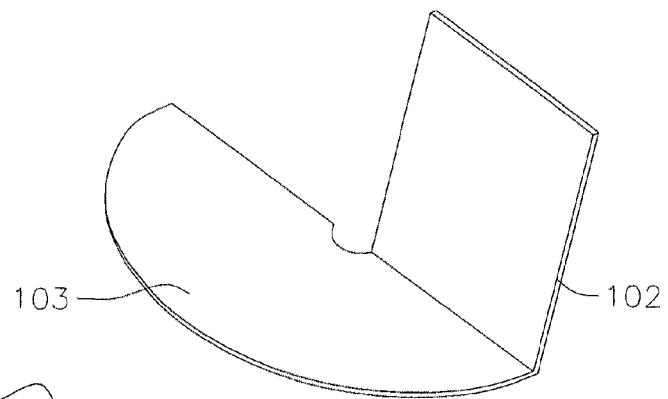
FIG.7
FIG.8
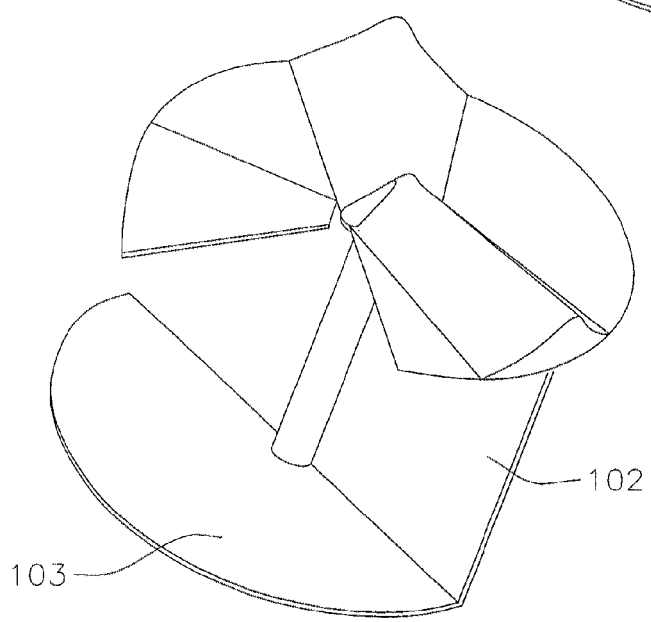

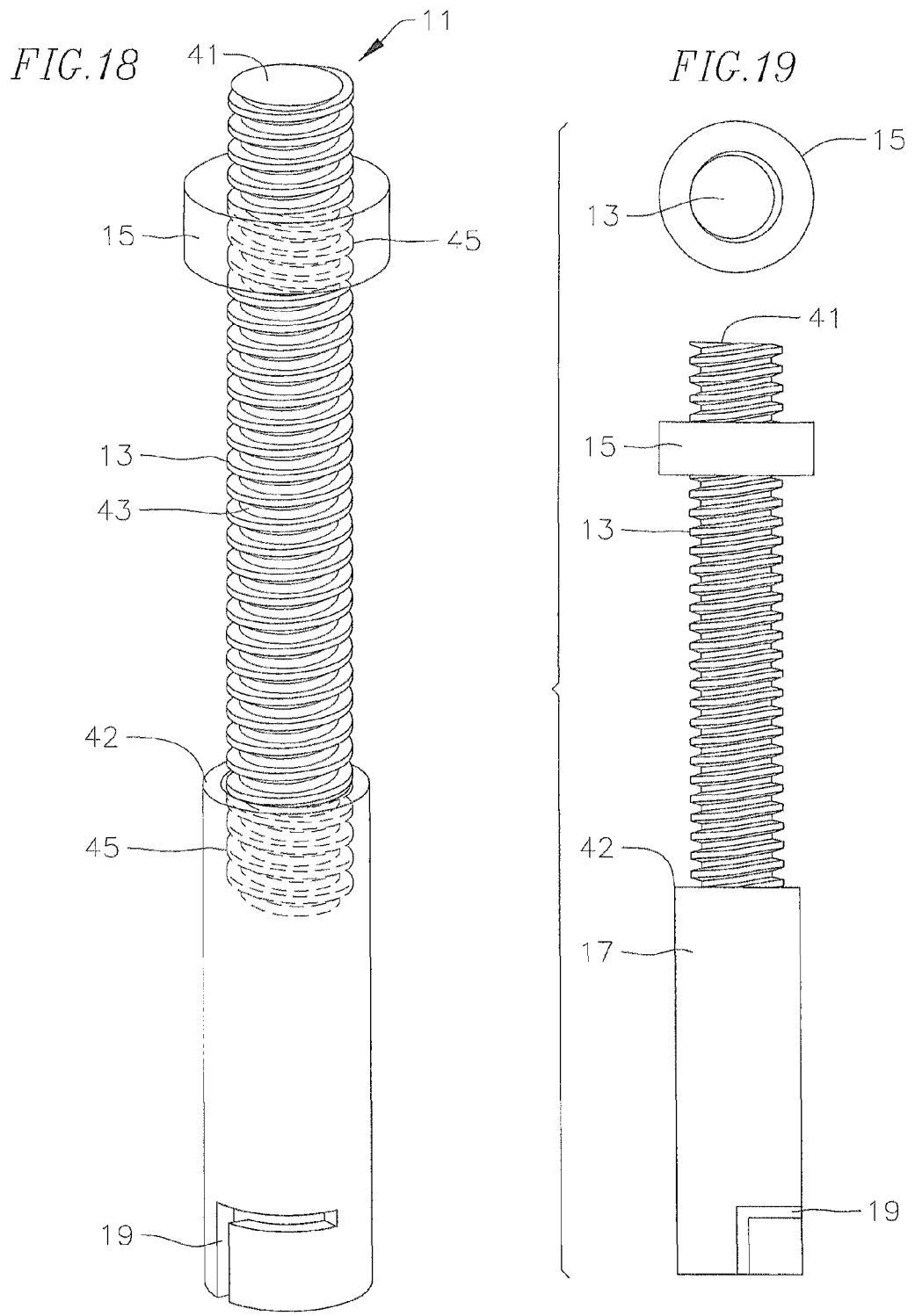

AUTOMATIC PET FOOD DISPENSING DEVICE

CROSS-REFERENCE TO RELATED APPLICATION(S)

This Application claims priority to U.S. Provisional Application No. 61/171,779, filed Apr. 22, 2009.

BACKGROUND OF THE INVENTION

The present invention relates to an improved automatic pet food dispensing device. More particularly, this invention relates to an automatic pet food dispensing device that will not only prevent the device from jamming in dispensing the pet food but also prevent unintentional release of food when it is waggled by the dog. Also, it will prevent deliberate act of dog to reach inside of the food dispensing hole using their paws. These preventative measures will assure any abundance of food that might lead to overweight or health issue.

The related U.S. Pat. No. 7,270,081 B2 by the inventor of this invention is incorporated by reference into this disclosure and is fully set forth herein.

Pet food dispensers of prior art have a serious problem, jamming, among many others. Since it was supposed to be automatic, the jammed pet food dispensing device is outright trouble to the pets and to the pet owners who are trusting the device and traveling for a couple of days.

The fact that the grains of pet food is small compared to the opening through which the pet food is led does not guarantee a smooth flow intended by the designer of the pet food dispensing device. The interaction between pet food particles and the inner wall of the container or the edges of the opening and even among the food particles generates a bunch of complex behaviors of the granular media, which is one of the major subjects of research for nonlinear dynamics. The granular particles may behave like a liquid under some conditions such as the size and shape of the individual particle, and be packed into a substantial solid block.

Accordingly, a need for an improved pet food dispensing device has been present for a long time considering the growing number of pets all around the world. This invention is directed to solve the problems and satisfy the long-felt need.

SUMMARY OF THE INVENTION

The present invention provides an automatic pet food dispensing device that solves the disadvantages of the prior art.

Accordingly, it is an object of the present invention to provide an automatic pet food dispensing device that prevents the jamming of the feeder by the food but also prevents unintentional release of food when it is waggled by the dog. Also, it will prevent a deliberate act of a pet to reach inside of the food dispensing hole using their paws. These preventative measures will prevent the release of any abundance of food that might lead to overweight or other health issues.

To achieve the above objectives, an automatic pet food dispensing device includes a pet food dispenser and an outer case housing the parts.

The pet food dispenser includes a shaft, a dispensing disc, a stirrer for stirring jammed pet food particles, a rectangular form push-out plate, and a semi-circular plate. The dispensing spouts leads the pet food from the space formed by the bottom of the dispensing disc.

The dispensing disc includes a top layer and a bottom layer. The top and bottom layers of the dispensing disc are positioned adjacently. The top layer comprises a top cutout portion and the bottom layer comprises a bottom cutout portion. The area of opening foimed by the top and bottom cutout portions are adjustable. The top layer of the dispensing disc includes one or more bumps on its top surface.

In an embodiment of the invention, the stirrer of the pet food dispenser includes a first flap extending from the first edge of the bottom layer of the dispensing disc, and the flap is bent downwardly below a horizontal plane.

The top and bottom layers have a substantially semi-circular shape, and each of the layers includes a first edge and a second edge. The angle of the arc recess defined by the second edge of the top layer and the first edge of the bottom layer varies from zero to one hundred eighty degrees.

The stirrer is made of material with flexibility. In an embodiment of the invention, the push-out plate of the pet food dispenser includes a rectangular plate on an upper portion of a semi-circular plate. The rectangular plate rotates counterclockwise by pushing food through a one third cutout on the circular plate in a lower portion of the plate. Upper portion of semi-circular plate and lower portion of one third cutout circular plate are adjacent. The angle of dispensing varies from ninety (90) degrees to one hundred eighty (180) degrees.

The shaft of the pet food dispenser includes a cylinder portion, a stopper ring portion, a rectangular form push-out portion and a connecting cylinder portion. The shaft is fixed securely to the top layer of the dispensing disc and engaged with the bottom layer of the dispensing disc with a predetermined friction. The stopper ring portion is fixed at a predetermined position along the cylinder portion to keep the top and bottom layers of the dispensing disc at the predetermined position. The connecting cylinder portion comprises a first end, and a second end, and is fixed with the cylinder portion. Also, the connecting cylinder portion includes an inverted-L shaped slit at the second end. The second end of the connecting cylinder portion is engaged with the driving device. The cylinder portion includes external threads, and the stopper ring portion and the connecting cylinder portion includes internal threads matching with the external threads of the cylinder portion.

The second edge of the top layer of the dispensing disc may include a second flap bent downwardly below the horizontal plane to provide additional stirring of the pet food.

Another embodiment of the invention, the push-out of the pet food dispenser includes a rectangular plate, upper portion of semi-circular plate and lower portion of one third cutout circular plate. Semi-circular plate and lower portion of one third cutoff circular plate are adjacent.

In another embodiment of the invention, the stirrer of the pet food dispenser includes a string member. The pet food dispensing device further includes an inner case. The string member straddles on grooves provided on the upper perimeter of the inner case of the pet food dispenser. The stirrer is made of material with high elasticity.

The shaft of the pet food dispenser includes a head portion, a cylinder portion, a rectangular push-out portion, partially flattened tail portion, and is fixed securely to the top layer of the dispensing disc and engaged with the bottom layer of the dispensing disc with a predetermined friction.

The top layer has substantially semi-circular shape and the bottom layer comprises a cutout portion, and each of the layers includes a first edge and a second edge of the openings. The angle of the arc recess defined by the second edge of top layer and the first edge of the bottom layer varies from zero to one hundred eighty degrees. The push-out portion comprises a rectangular plate and semi-circular plate which are attached to a shaft.

The angle of shaft varies from ninety (90) degrees to one hundred eighty (180) degrees. Also, to prevent jamming of food, the angle of shaft should be more than ninety (90) degrees.

In each of the above embodiments, the automatic pet food dispensing device, further includes a pet food container, a slant guide, a driving device for powering the pet food dispenser, and one or more dispensing spouts.

The slant guide of the pet food dispenser has a downhill slope with a predetermined angle toward the dispensing spouts, and is integrally formed with the outer case of the pet food dispenser.

The bumps on the top layer of the dispensing disc are radial and protruding upward. The radial bumps have a cross-sectional shape of isosceles triangle or saw-tooth tilted to the direction of rotation of the dispensing disc.

The automatic pet food dispensing device further includes a plurality of supporting horizontal legs long enough to prevent toppling along the rim of the bottom of the pet food dispensing device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 6 is a perspective detail view of the top and bottom layer of the pet food dispense disc;

FIG. 7 is a perspective detail view of upper portion of semi-circular plate of the pet food dispensing disc;

FIG. 8 is a perspective detail view of the dispense device;

FIG. 18 is a perspective view of the shaft of the pet food dispenser;

FIG. 19 is a side elevation view of the shaft of the pet food dispenser;

DETAILED DESCRIPTION OF THE PREFERRED EMBODIMENTS

Figure 1:
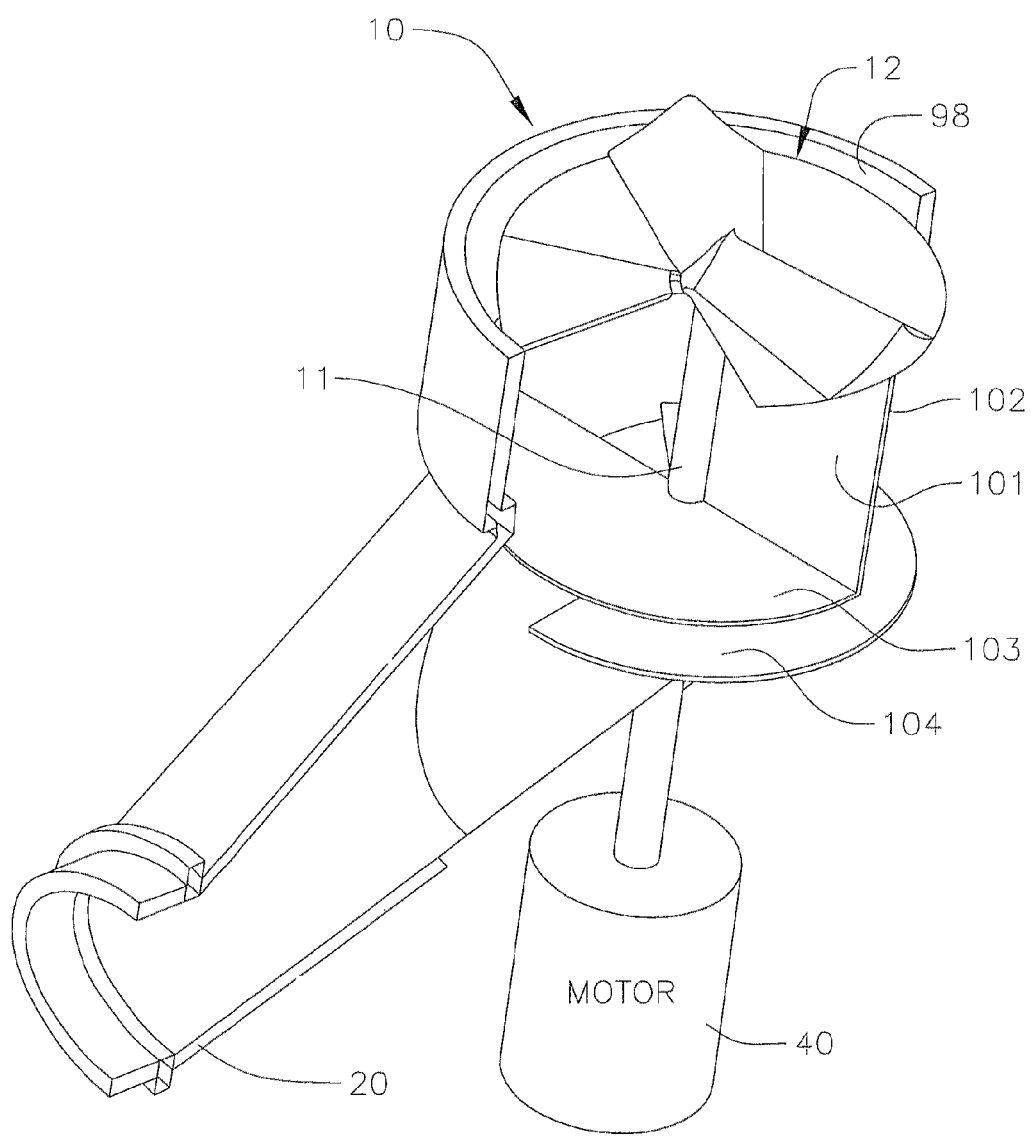
FIG. 1 is a perspective sectional view of a first embodiment of a pet food dispensing device according to the invention.
Figure 2:
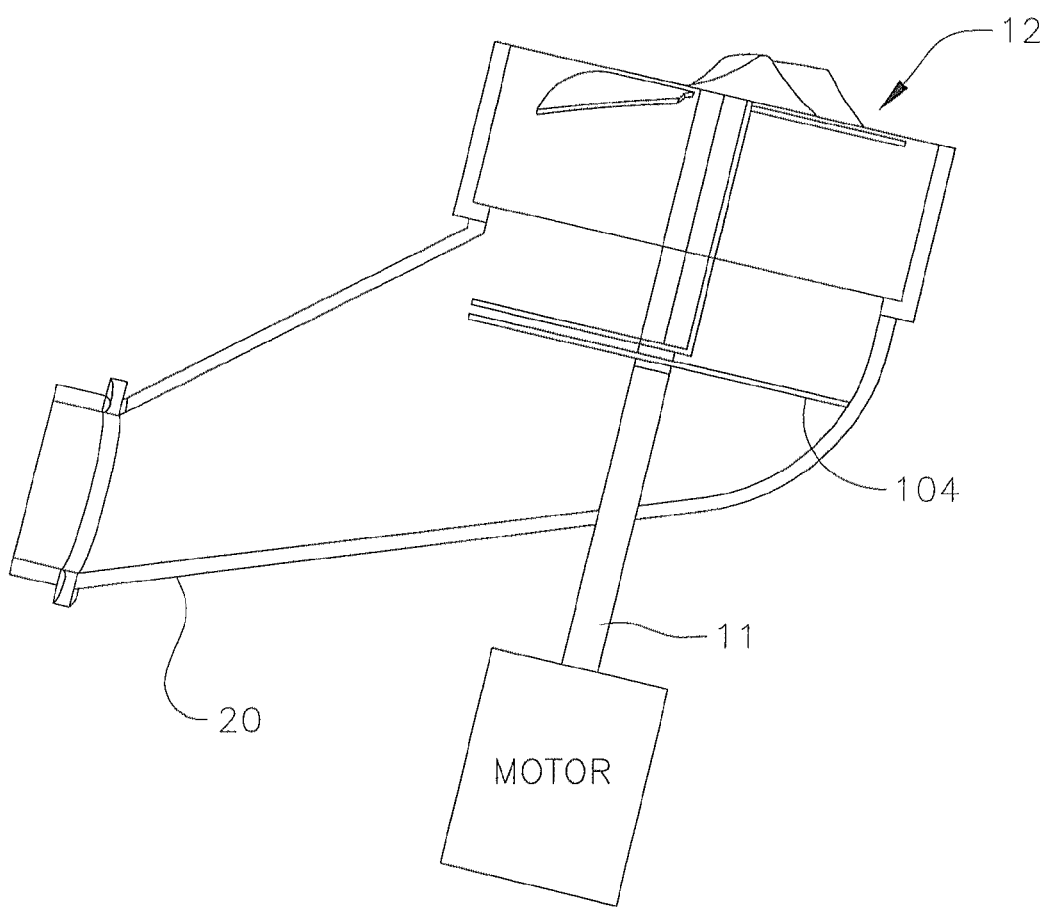
FIG. 2. is a cross-sectional side view of FIG. 1.

FIGS. 1 through 23 show an embodiment of the present invention. In the first embodiment of the invention, an automatic pet food dispensing device includes a pet food dispenser 10, receiving plate 103, rectangular form push-out plate 102, and outer case 99 housing the parts. The pet food dispenser 10 includes a shaft 11, dispensing disc 12 and stirrer 30 shown in FIG. 3 for stirring jammed pet food particles. The dispensing spouts 20 leads the pet food from the space 66, formed by the receiving plate 103. The rectangular push-out plate 102 rotates counterclockwise pushing towards a lower portion of one third cutout circular plate 104.

As shown in FIGS. 9 through 14, the dispensing disc 12 includes a top layer 14 and a bottom layer 16. The top and bottom layers 14, 16 of the dispensing disc 12 are positioned adjacently. The top layer 14 comprises a top cutout portion 56 and the bottom layer 16 comprises a bottom cutout portion 57. The area of opening or arc recess 62 formed by the top and bottom cutout portions 56, 57 is adjustable. The top layer 14 of the dispensing disc 12 includes one or more bumps 18 on the top surface.

Figure 12:
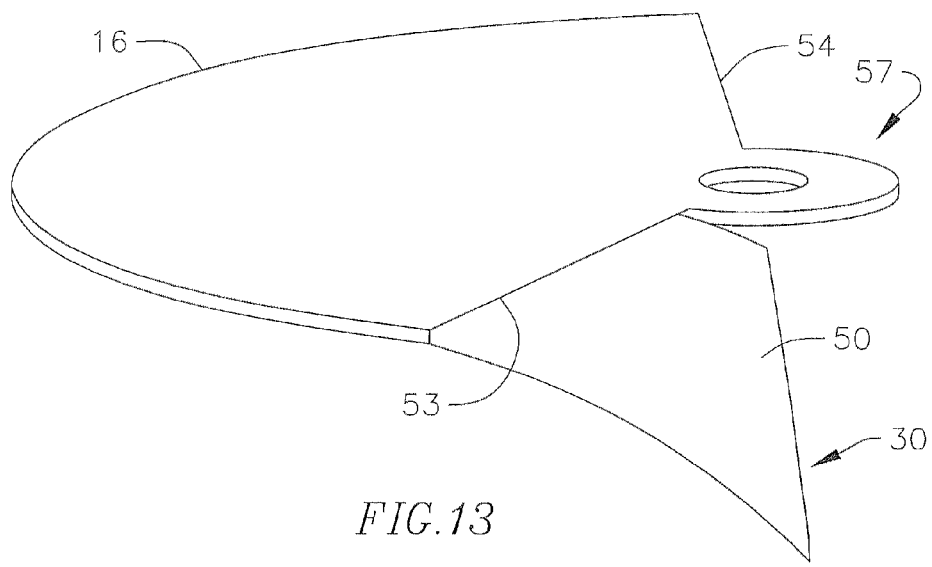
FIG. 12 is a perspective view of the bottom layer of the pet food dispensing disc with fully opened arc recess.
Figure 13:
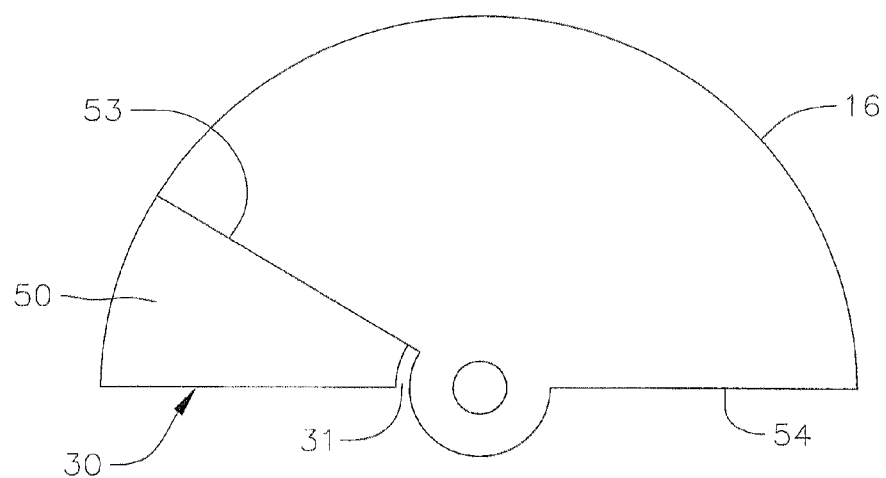
FIG. 13 is a top view of the bottom layer of the pet food dispensing disc.
Figure 14:
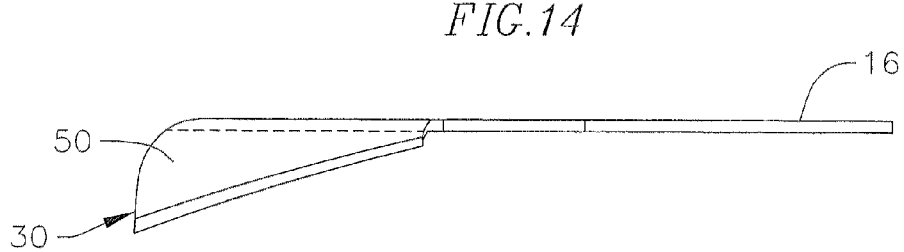
FIG. 14 is a side elevation view of the bottom layer of the of the pet food dispensing disc.
Figure 15:
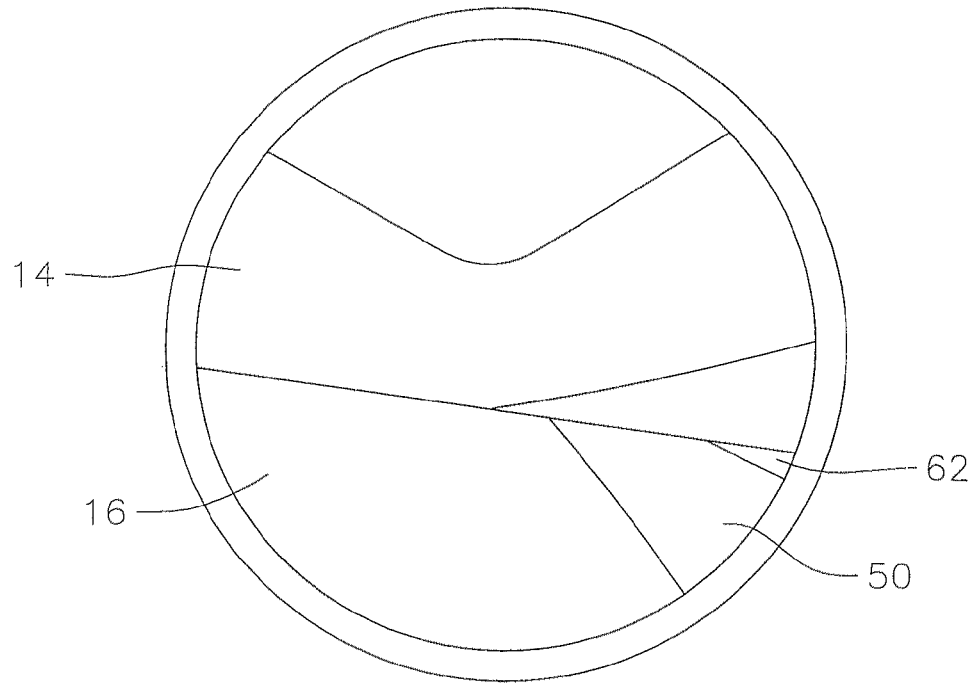
FIG. 15 is a top view of the pet food dispenser with closed arc recess.

As shown in FIGS. 9 through 14, the top and bottom layers 14, 16 have a substantially semi-circular shape, and each of the layers 14, 16 includes a first edge 51, 53 and a second edge 52, 54 respectively, as also shown in FIGS. 12 and 13. The stirrer 30 of the pet food dispenser 12 includes a first flap 50 extended from the first edge 53 of the bottom layer 16 of the dispensing disc 12, and the first flap 50 is bent downwardly below the horizontal plane. The first flap 50 is made of material with flexibility.

Figure 3:
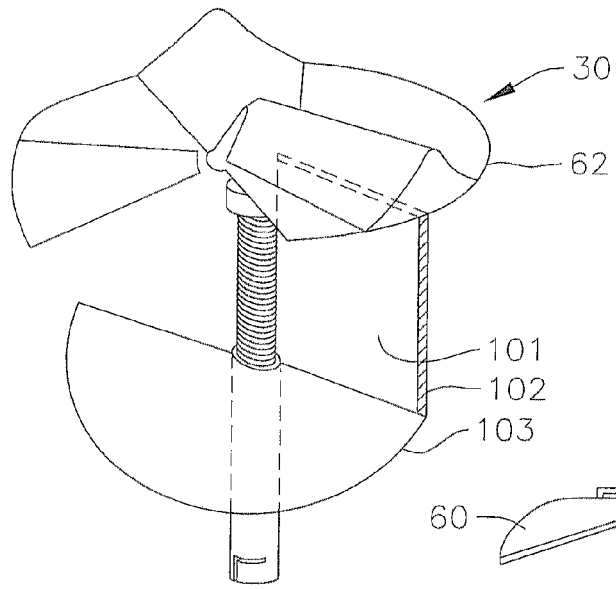
FIG. 3 is a perspective detail view FIG. 3.
Figure 4:
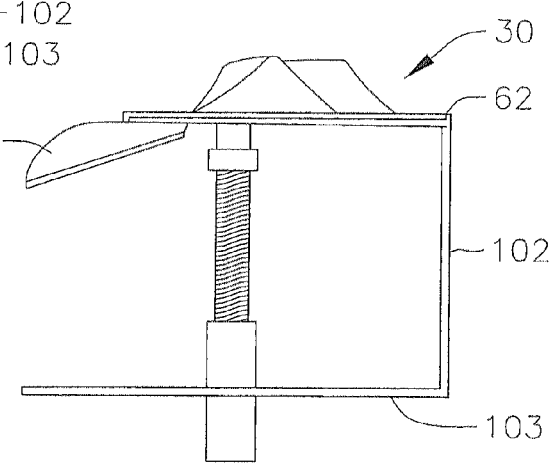
FIG. 4 is a side view of the pet food dispensing device.
Figure 5:
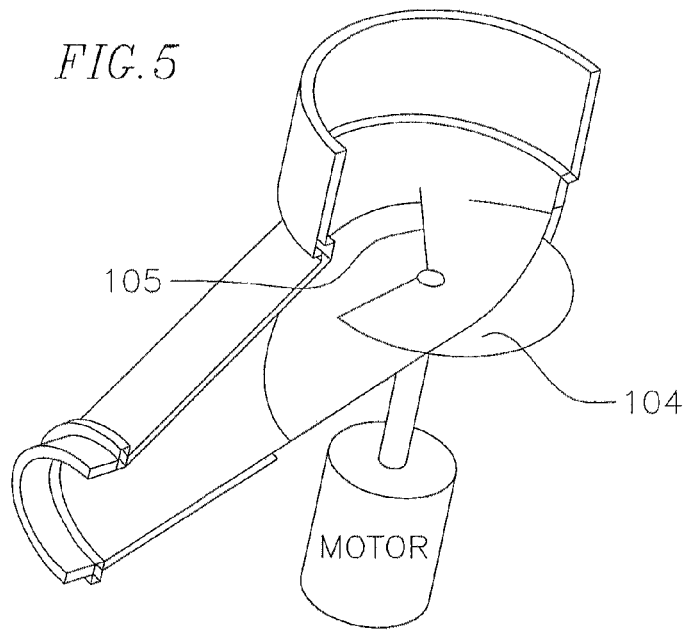
FIG. 5 is a detail view of the lower portion of one third cutout circular plate of the pet food dispensing disc.
Figure 9:
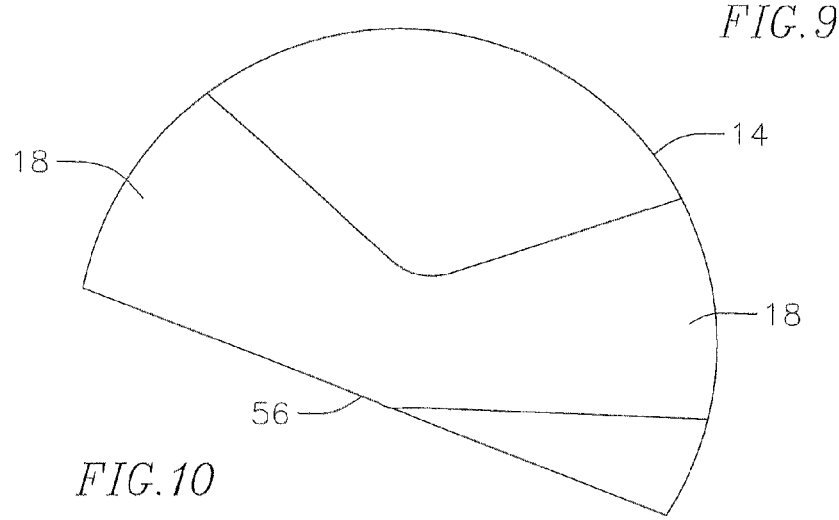
FIG. 9 is a top view of the top layer of the pet food dispensing disc.
Figure 10:
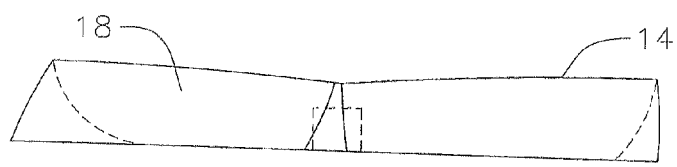
FIG. 10 is a side elevation view of the top layer of the pet food dispensing disc.
Figure 11:
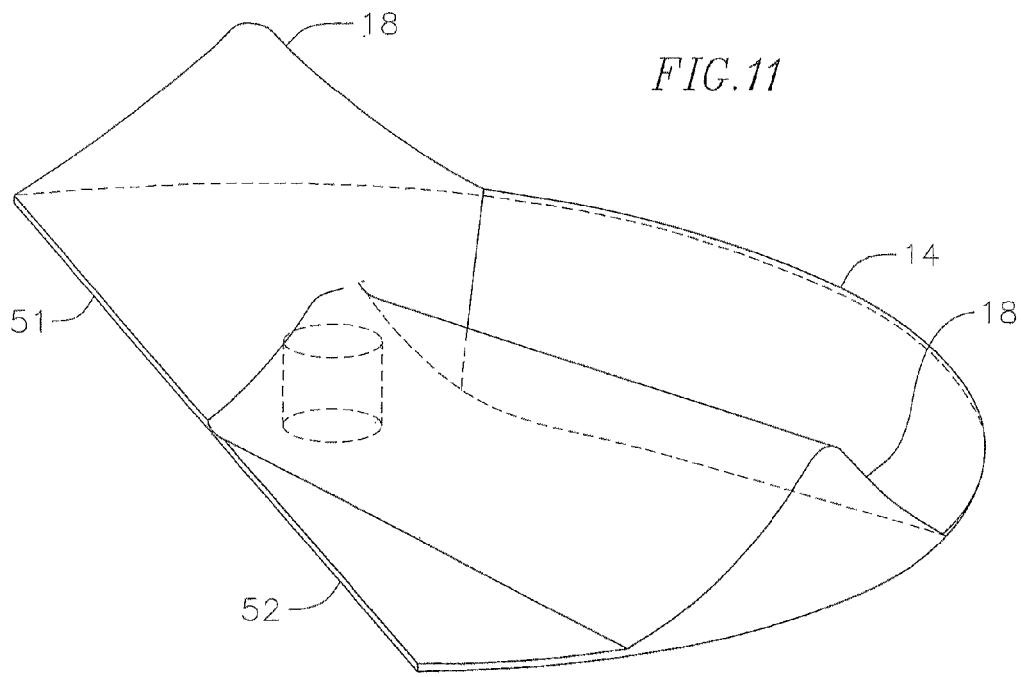
FIG. 11 is a perspective view of the top layer of the pet food dispensing disc with closed arc recess.
Figure 16:
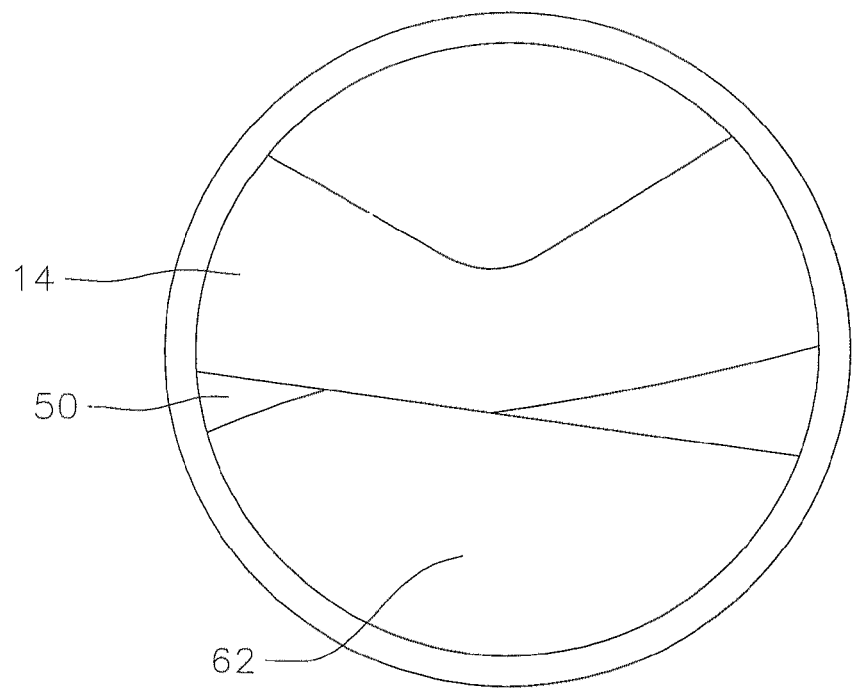
FIG. 16 is a top view of the pet food dispenser with fully opened arc recess.
Figure 17:
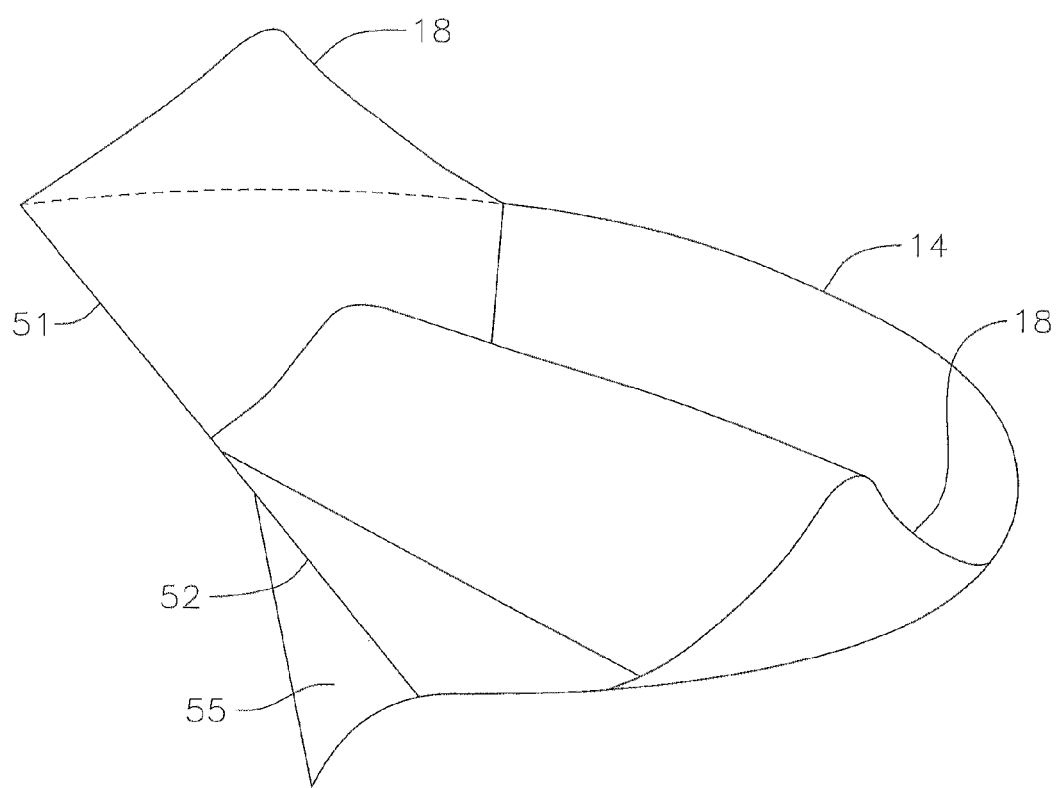
FIG. 17 is a perspective view of the top layer of the dispensing disc with a second flap.

The angle of the arc recess 62 defined by the second edge 52 of top layer 14 and the first edge 53 of the bottom layer 16 varies from zero (refer to FIG. 15) to one hundred eighty degrees (refer to FIG. 16). As shown in FIG. 3 Through 5, the upper portion plate 103 and lower portion plate 104 (refer to FIG. 5) are adjacent. Plate 103 is a semi-circular plate and plate 104 is a one third cutout circular shape. Both plates 103 and 104 are attached together. The angle of the dispensing device varies from ninety (90) degrees to one hundred eighty (180) degrees.

As shown in FIG. 18, the shaft 11 of the pet food dispenser 10 includes a cylinder portion 13, a stopper ring portion 15, and a connecting cylinder portion 17. The shaft 11 is fixed securely to the top layer 14 of the dispensing disc 12 and engaged with the bottom layer 16 of the dispensing disc 12 with a predetermined friction. The angle/size of the arc recess/opening 62 can be adjusted. The stopper ring portion 15 is fixed at a predetermined position along the cylinder portion 13 to keep the top and bottom layers 14, 16 of the dispensing disc 12 at the predetermined position. The connecting cylinder portion 17 includes a first end 41 and a second end 42, and is fixed with the cylinder portion 13. Also, the connecting cylinder portion 17 includes an inverted-L shaped slit 19 at the second end 42. The second end 42 of the connecting cylinder portion 17 is engaged with the driving device (not shown). The cylinder portion 13 includes external threads 43, and the stopper ring portion 15 and the connecting cylinder portion 17 include internal threads 45 matching with the external threads 43 of the cylinder portion 13.

Alternatively, the second edge 52 of the top layer 14 of the dispensing disc 12 may include a second flap 55 (refer to FIG.

17) bent downwardly below the horizontal plane to provide additional stirring of the pet food.

The bottom layer 16 of the dispensing disc 12 includes a notch, preferably a circular slit 31 around the center, wherein the extent of the circular slit 31 corresponds to the bending part of the bottom layer 16, which is the flap 50. The stirrer 30 is made of material with flexibility.

Figure 20:
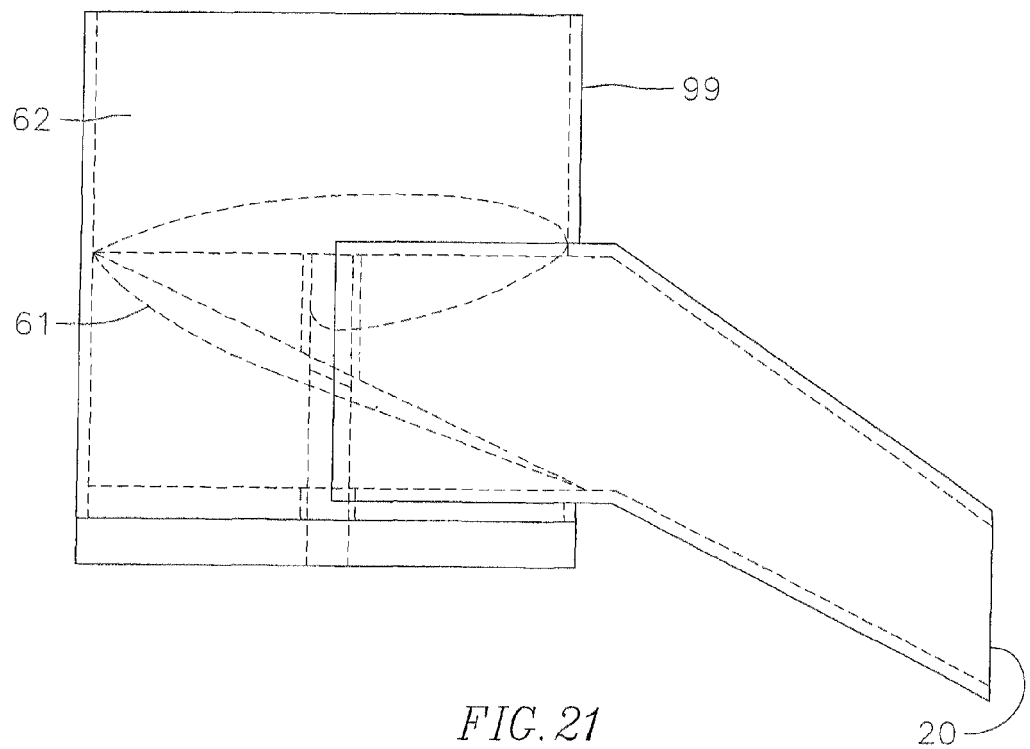
FIG. 20 is a side elevation view of the case.
Figure 21:
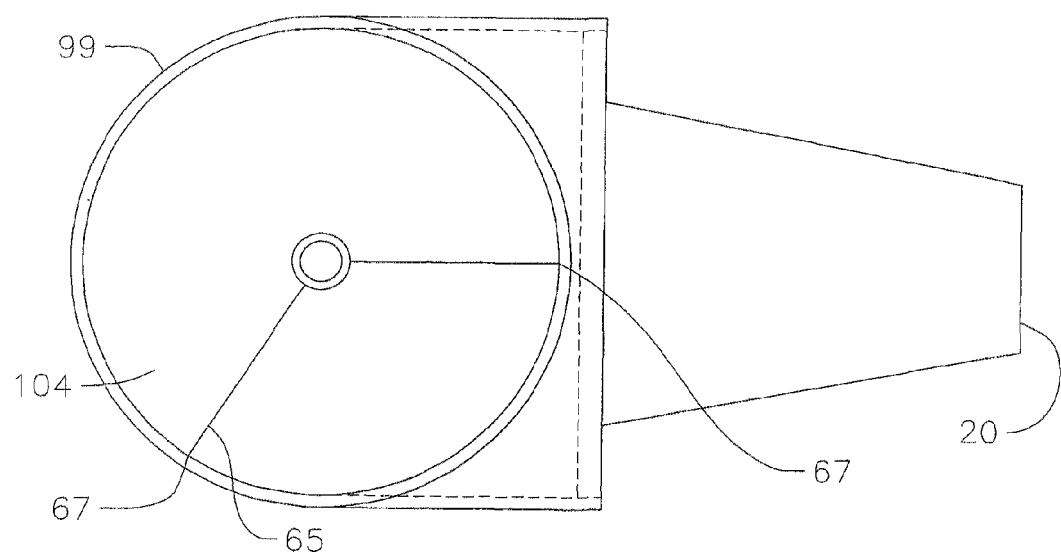
FIG. 21 is a top view of the case of a pet food dispensing device.

As shown in FIGS. 20 and 21, the shaft 11 of the pet food dispenser 12 engages with the upper portion semi-circular plate 103 without friction through a space 66 provided on the top of plate 104 of the slant guide 61. In addition, an alternative stirrer can be a string member 65 which straddles in grooves 67 within the housing.

As shown in FIG. 3, without any friction supplied to plate 103 through space 66 pushed down to the end of edge 105 by rotating of push-out plate 102 counterclockwise. The push-out portion consist of rectangular plate 101 and semi-circular plate 103.

Figure 23:
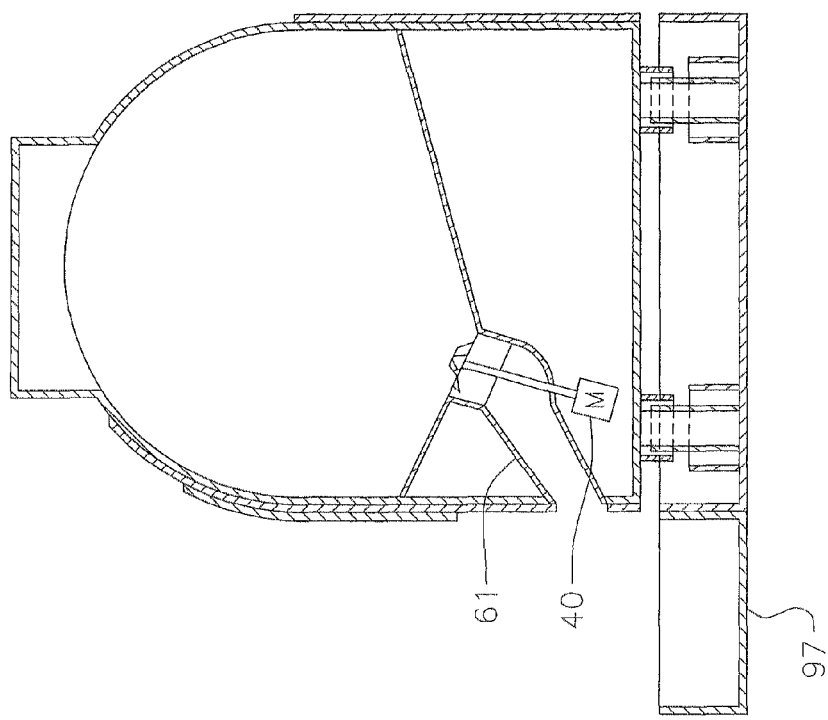
FIG. 23 is a side-sectional view of FIG. 22.
Figure 22:
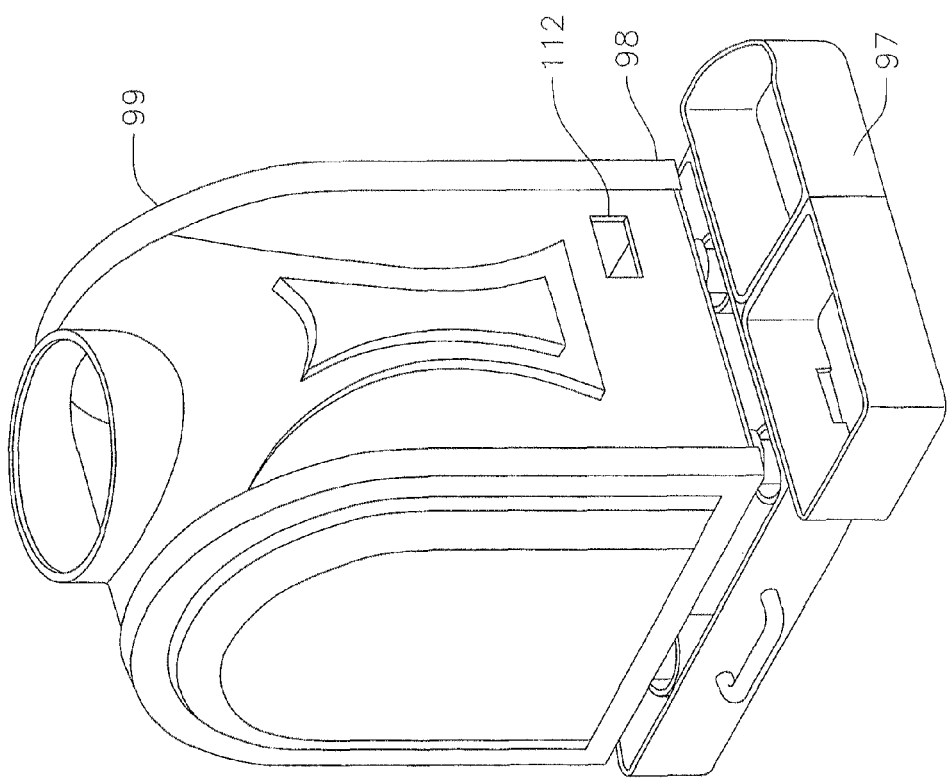
FIG. 22 is a perspective view of the pet food dispensing device within a pet food container.

In each of the above embodiments, the automatic pet food dispensing device, further includes a pet food container 97, a slant guide 61, a driving device or motor 40 for powering the pet food dispensing device. The pet food container 97 is detachably accepted to the top 98 of the outer case 99 as shown in FIGS. 22 and 23.

The slant guide 61 of the pet food dispenser 10 has a downhill slope with a predetermined angle toward the dispensing spouts 112, and is integrally formed with the outer case 99.

The driving device includes an electrical motor, which can be powered by a battery or from a wall outlet.

The driving device engages with and drives the shaft 11 of the pet food dispenser 12.

Although the invention has been shown and described in considerable detail and are pointed out in the annexed claims, other versions are possible by converting the aforementioned construction. Therefore, the scope of the invention shall not be limited by the specification specified above.

What is claimed is:

1. An automatic pet food dispensing device comprising:
   a) a pet food dispenser comprising a shaft, a dispensing disc attached to the shaft, a vertical rectangular push-out plate below the dispensing disc attached to the shaft, a semi-circular plate attached to the push-out plate such that the push-out plate is a thin wall and is positioned in a space between the dispensing disc and the semi-circular plate allowing pet food to fill up continuously in front of and behind the push-out plate, a one-third cutout circular plate below the semi-circular plate, and a flexible stirrer attached to the dispensing disc for stirring jammed pet food particles; and
   b) an outer case housing the pet food dispenser, wherein the dispensing disc includes a top layer and a bottom layer adjacent the push-out plate and the semi-circular plate, wherein the top and bottom layers of the dispensing disc are positioned adjacently, wherein the top layer includes a top cutout portion and the bottom layer includes a bottom cutout portion, wherein the top cutout portion and the bottom cutout portion are adjustable with respect to each other to adjust an area formed by the top cutout portion and the bottom cutout portion, wherein the top layer of the dispensing disc comprises one or more bumps on a top surface.

2. The automatic pet food dispensing device of claim 1, wherein the one-third cutout circular plate is positioned adjacent the semi-circular plate and is attached to a slant guide within the outer case.

3. The automatic pet food dispensing device of claim 1, wherein the stirrer of the pet food dispenser comprises a first flap extending from a first edge of the bottom layer of the dispensing disc, wherein the first flap is bent downwardly below the horizontal plane.

4. The automatic pet food dispensing device of claim 1, wherein the stirrer is made of material with flexibility.

5. The automatic pet food dispensing device of claim 2, wherein the slant guide is positioned underneath the stirrer and wherein the semi-circular plate is attached to the rectangular push-out plate.

6. The automatic pet food dispensing device of claim 1, wherein the shaft of the pet food dispenser comprises a cylinder portion, a stopper ring portion, the rectangular push-out plate, the semi-circular plate and a connecting cylinder portion, wherein the shaft is fixed securely to the top layer of the dispensing disc and engaged with the bottom layer of the dispensing disc with a predetermined friction, wherein the stopper ring portion is fixed at a predetermined position along the cylinder portion to keep the top and bottom layers of the dispensing disc at the predetermined position, wherein the connecting cylinder portion comprises a first end, and a second end, and is fixed with the cylinder portion, wherein the connecting cylinder portion comprises an inverted-L shaped slit at the second end.

7. The automatic pet food dispensing device of claim 6, wherein the second end of the connecting cylinder portion is engaged with a driving device.

8. The automatic pet food dispensing device of claim 6, wherein the cylinder portion comprises external threads, wherein the stopper ring portion and the connecting cylinder portion comprise internal threads matching with the external threads of the cylinder portion.

9. The automatic pet food dispensing device of claim 1, wherein the one-third cutout circular plate is flexible.

10. The automatic pet food dispensing device of claim 1, wherein the stirrer of the pet food dispenser comprises a string member which straddles on grooves provided on an upper perimeter of an inner case of the pet food dispenser.

11. The automatic pet food dispensing device of claim 10, wherein the stirrer is elastic.

12. The automatic pet food dispensing device of claim 1, further comprising:
   a) a pet food container comprising a top end and a bottom end;
   b) a slant guide;
   c) a driving device powering the pet food dispenser; and wherein
   d) the rectangular push-out plate turns counterclockwise dispensing pet food from an upper portion of the semi-circular plate towards the slant guide.

13. The automatic pet food dispensing device of claim 12, wherein the slant guide of the pet food dispenser has a downhill slope with a predetermined angle toward a dispensing spout.

14. The automatic pet food dispensing device of claim 13, wherein the slant guide is integrally formed with the outer case.

15. The automatic pet food dispensing device of claim 1, wherein the bumps on the top layer of the dispensing disc are radial and protruding upward.

16. The automatic pet food dispensing device of claim 15, wherein the radial bumps have a cross-sectional shape of isosceles triangle or saw-tooth tilted to a direction of rotation of the dispensing disc.

17. The automatic pet food dispensing device of claim 12, wherein the pet food container is detachably connected to the outer case.

* * * * *